Figure 1:
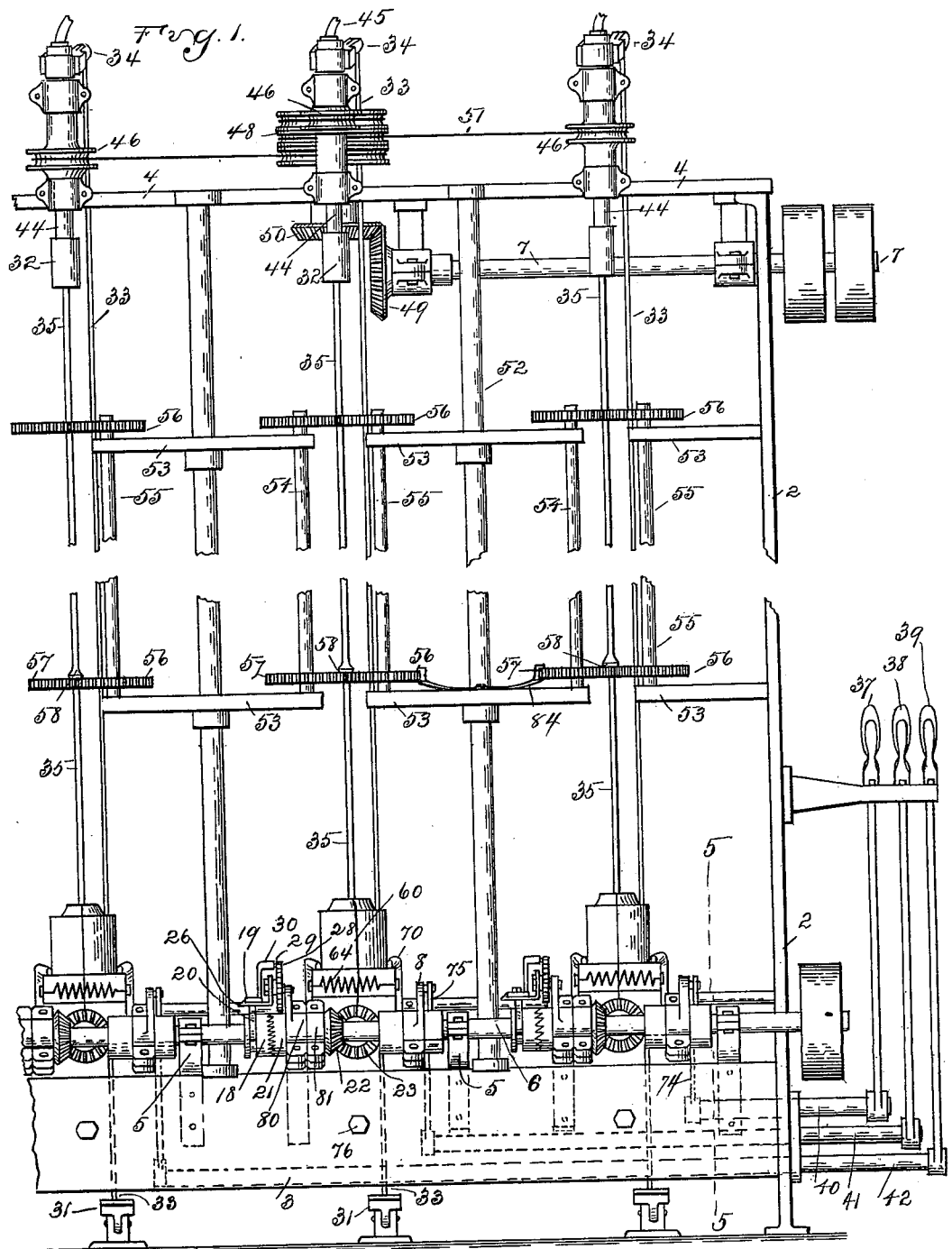

No. 659,289. Patented Oct. 9, 1900.
H. J. COLBURN.
GLASS BLOWING MACHINE.
(Application filed Oct. 14, 1899.)
(No Model.) 5 Sheets—Sheet 2.
Fig. 2.
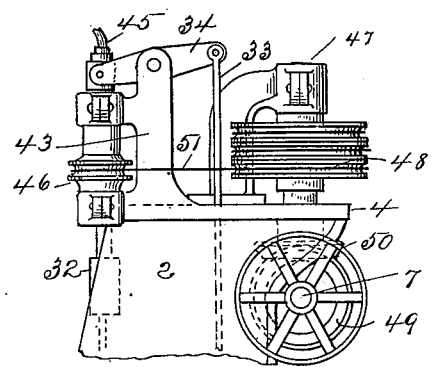
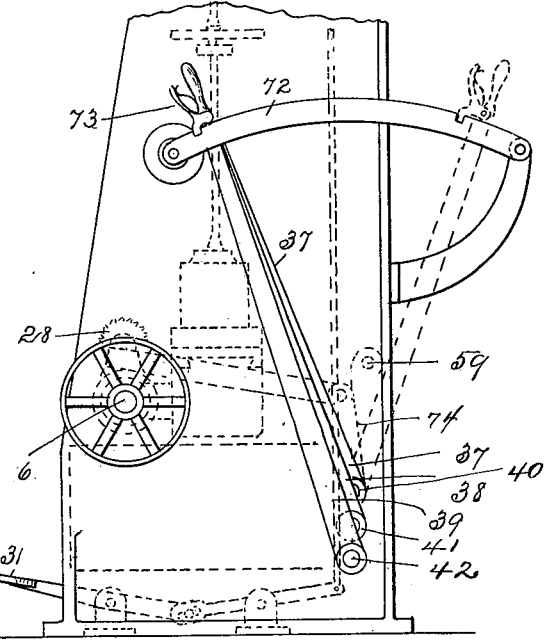
Fig. 3.
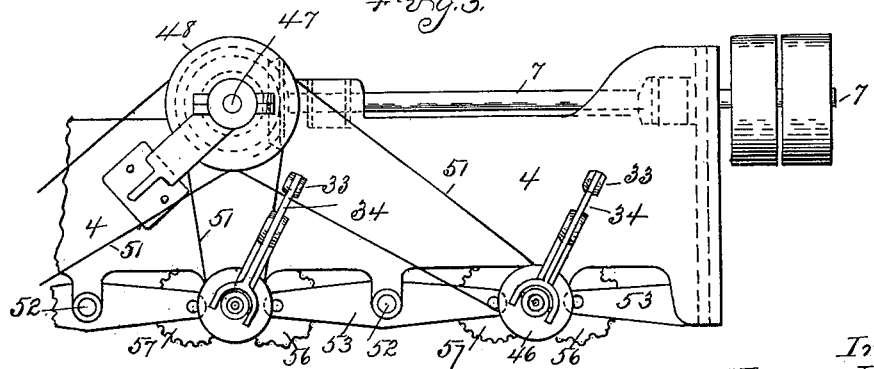
Witnesses:
H. C. Smith.
M. O. Dougherty.
Inventor
Henry J. Colburn
By
Att'ys.

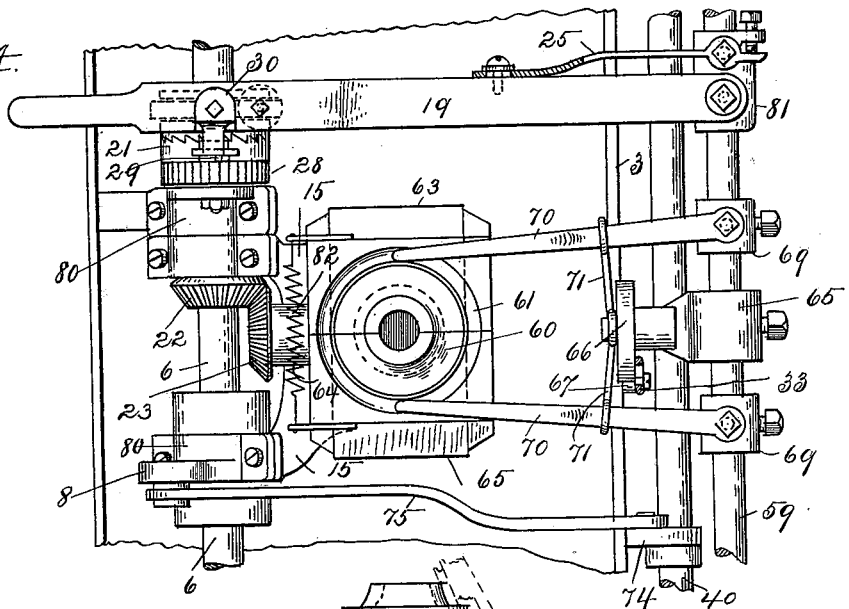

No. 659,289. Patented Oct. 9, 1900.
H. J. COLBURN.
GLASS BLOWING MACHINE.
(Application filed Oct. 14, 1899.)
(No Model.) 5 Sheets—Sheet 4.
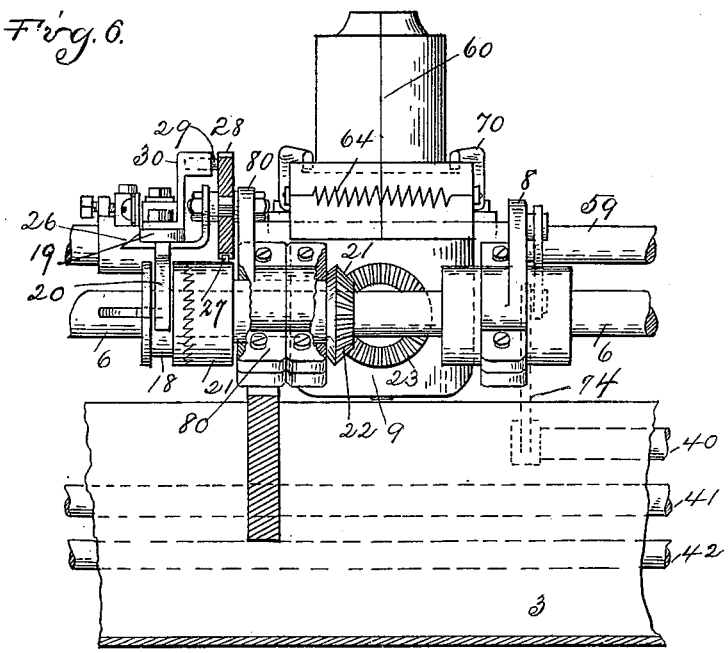
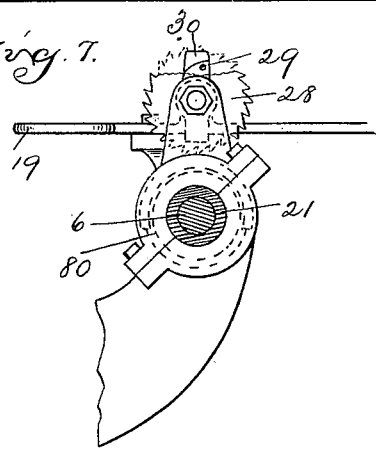
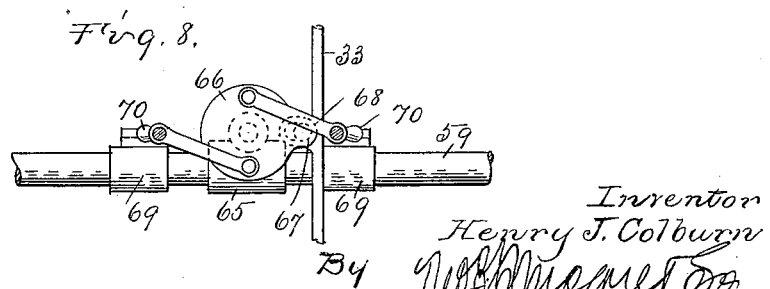

No. 659,289. Patented Oct. 9, 1900.
H. J. COLBURN.
GLASS BLOWING MACHINE.
(Application filed Oct. 14, 1899.)
(No Model.) 5 Sheets—Sheet 5.
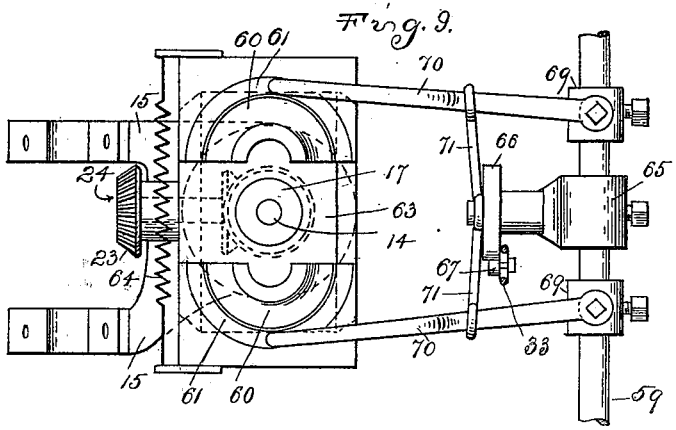
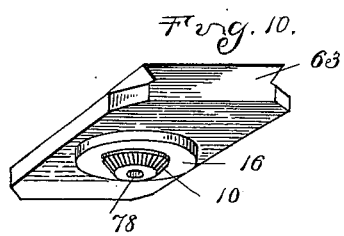
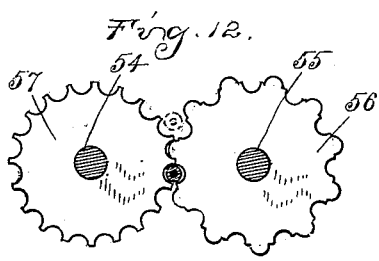
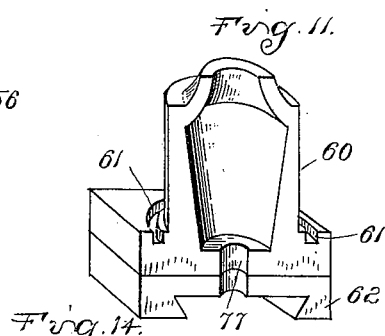
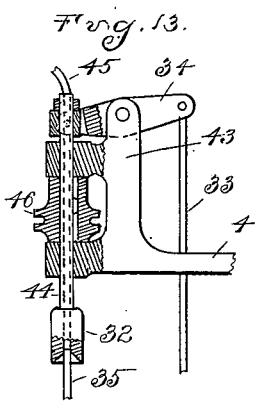
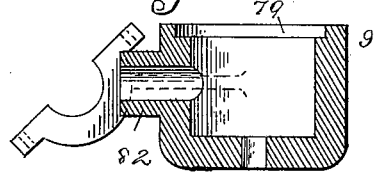
Witnesses
H. C. Smith
M. D. Dogherty
Inventor
Henry J. Colburn
By ... Attys.
THE NORRIS PETERS CO., PHOTO-LITHO., WASHINGTON, D. C.

UNITED STATES PATENT OFFICE.

HENRY J. COLBURN, OF TOLEDO, OHIO, ASSIGNOR TO THE TOLEDO GLASS COMPANY, OF SAME PLACE.

GLASS-BLOWING MACHINE.

SPECIFICATION forming part of Letters Patent No. 659,289, dated October 9, 1900.

Application filed October 14, 1899. Serial No. 733,685. (No model.)

*To all whom it may concern:*

Be it known that I, HENRY J. COLBURN, a citizen of the United States, residing at Toledo, in the county of Lucas and State of Ohio, have invented certain new and useful Improvements in Glass-Blowing Machines, of which the following is a specification, reference being had therein to the accompanying drawings.

This invention relates to glass-blowing machines; and it consists particularly in the construction, arrangement, and combination of the various parts, as more fully hereinafter described, and particularly pointed out in the claims.

In the drawings forming part of this specification, Figure 1 is a front elevation of a glass-blowing machine constructed according to my invention. Fig. 2 is an end elevation of said machine, partly broken away. Fig. 3 is a plan view of a portion of the upper end of the machine. Fig. 4 is a plan view of one of the molds and of the operating devices therefor and of a portion of the mold-wetting tank thereunder. Fig. 5 is a sectional view on line 5 5, Fig. 1, the mold-supporting case being shown with one side broken away, showing the disposition of gears therein. Fig. 6 is a front elevation of one of the molds and its directly-connected coöperating devices, showing a section of the mold-wetting tank thereunder. Figs. 7 and 8 illustrate detail parts hereinafter described. Fig. 9 is a plan view of the mold parts (the mold being shown opened) and mold opening and closing devices. Fig. 10 is a perspective view of the mold-section table, and Fig. 11 is a like view of one mold-section and its subbase. Fig. 12 is a plan view of two blowiron-holding disks. Fig. 13 illustrates detail parts below described. Fig. 14 is a sectional view of the mold-supporting case and mold-support.

Referring to the drawings, 2 2 indicate the end uprights, 4 the top plate, and 52 the vertical intermediate posts of the frame of the machine. A mold-wetting tank 3, secured firmly between the said end uprights 2 at the lower ends thereof, constitutes substantially the base of the machine.

A main driving-shaft 7 is supported in suitable bearings on the upper part of the machine, on which are two pulleys, as shown, one of which may receive a belt from some suitable motor, and a belt may be applied to the second pulley connecting the same with a pulley on a horizontal mold-actuating shaft 6 near the lower end of the machine over said mold-wetting tank 3. If preferable, a tank may be provided for each mold. The said main driving-shaft 7 has a bevel-gear 49 fixed on one end, which engages with a like gear 50 on the lower end of a short vertical shaft 47, which runs in suitable bearings on the upper end of the machine, whereby rotary motion is imparted to a grooved pulley 48 on said shaft 47. Said pulley 48 is adapted to drive, through a suitable belt or belts 51, as below described, one or more blowiron-actuating spindles 44.

The drawings illustrate in Fig. 1 three molds 60 and certain mechanisms contiguous to and operating with each one of said molds only and independently of the other molds. Said illustration in Fig. 1 is provided so that the manner of arranging an indefinite number of molds upon one line of shafting 6 may be fully understood; but as each of said molds and the mechanisms directly connected therewith embody like constructions the description of one and the manner of operating the same will suffice for the three shown in said last-named figure. Said shafting 6 is given the requisite rotary motion through said connection with the main shaft 7.

The mold 60 consists of two parts or sections, (one of which is shown in Fig. 11,) on the bottom of which is firmly secured a subbase 62, having a dovetail-shaped groove therein. A semicircular groove 61 is formed in the upper surface of the base proper of the section, and shaft-passage 77 (one-half in each mold-section) is formed through the bottom. Said two mold-sections are supported on the mold-section table 63, Fig. 10, and they have a sliding movement thereon engaging the dovetail rib thereon, whereby the sections are moved toward and from each other in closing and opening the mold. Said mold-section table 63 has integral with its under side the circular projection 16 and the bevel-gear 10. A shaft-passage 78 is formed through the center of said gear 10 and the said table.

A shaft 14 (see Fig. 5) extends from the inside of the bottom of the mold through the same and through the table 63 and through the mold-supporting case 9, as shown in said last-named figure. Said shaft 14 has a circular plate or head 17 thereon, (see Fig. 9,) which constitutes the bottom proper of the mold. The said mold-supporting case (see Fig. 14) has a circular recess 79 in its upper side, which receives therein said circular projection 16 on the table 63. Referring to Fig. 5, a gear 11 there shown is fixed on said shaft 14 within the case 9. The gear 10 there seen is that shown as a part of the said table 63, and the gear 13 in said case, which engages said gears 10 and 11, is fixed on the end of the shaft 24, which shaft extends through the arm 82 of said case, and on the outer end of said shaft is fixed the gear 23, to which rotary motion is given by the gear 22, Figs. 1, 4, and 6. Said gear 22 is fixed on one end of a clutch-sleeve 21, which is hung firmly on said shaft 6 and is caused to rotate with and by said shaft or to remain at rest thereon by the action of the below-described devices. A clutch-collar 18 has a spline connection with said shaft 6, but is free to slide thereon for engagement with and movement from said clutch-sleeve 21, whereby the latter is rotated and stopped. Said clutch-collar 18 is engaged by a fork 20, carried on a flexible shipping-lever 19, Figs. 4 and 6, which lever is pivotally hung by one end to a sleeve 81 on the part-supporting shaft 59 and extends from thence over said collar, as shown. A spring 25, secured by one end to said sleeve 81 and by the opposite end to said lever, acts to swing the fork-bearing end thereof and said clutch-collar away from the serrated end of said clutch-sleeve 21 and stop the rotary motion of the latter. A latch-spring 26, Fig. 6, is supported on the upper part of the yoke 80, and its free end extends under the end of the said lever and engages the latter, thereby holding said lever and clutch-collar in the position shown in said last-named figure. On the stud on which said spring 26 is held is placed a ratchet-wheel 28, Figs. 5 and 6, and a pin 27 on said sleeve 21 strikes a tooth of said ratchet-wheel at the completion of each full rotation thereof. Consequently, there being twenty-five teeth on said ratchet-wheel, the latter will be caused to rotate once in every twenty-five rotations of said shaft 6 and the sliding clutch-collar carried thereon. The ratchet 28 is interchangeable for others of different numbers of teeth, whereby the duration of the rotary movement of the molds 60 may be varied, according to the varying thickness of the blown articles. An upstanding arm-bearing post 30 is rigidly secured on said lever 19, having an arm thereon extending toward the adjoining face of said ratchet-wheel 28, on which is a horizontally-projecting pin 29. The under side of said arm on the post 30 is inclined or cam-shaped, as indicated in Fig. 7, to the end that when said pin 29 is carried against the under side of said arm the post 30 and the end of said lever 19, to which it is attached, are lifted out of engagement with said spring 26, and said spring 25 then acts to swing the free end of said lever and the clutch-collar 18 so that the latter is disengaged from the clutch-sleeve 21, as described, and causing the movements of the latter and parts driven thereby to cease at the end of twenty-five revolutions of said shaft 6. Said last-named shaft has its bearings on and is supported to rotate by the brackets 5, which are bolted to the tank 3, and indirectly by the boxes 80, which are also bolted to said tank and in which said clutch-sleeve 21 is held to rotate. Each mold of the series comprising the herein-described system is operated for wetting the same in water contained in said tank 3 thereunder by a rock-shaft. Said rock-shafts for the three molds and accessories illustrated in Fig. 1 are indicated by 40, 41, and 42 and are suitably supported on the rear side of said tank or other convenient place. Each of said shafts is provided with a hand-lever 37, 38, or 39, the free end of each lever swinging at the side of a curved latch-bar 72, Fig. 2, and having a spring-latch thereon for engagement with a notch in said bar at each extremity of said bar, as shown. Referring now to the mold at the right in Fig. 1 and to said rock-shaft 40, the latter has an upright arm 74, Figs. 1 and 5, fixed thereon, to which one end of a connecting rod or bar 75 is connected, Figs. 4 and 5, and the opposite end of said rod is connected to an arm 8 on one of the boxes 80 on one of the arms 15 on said mold-supporting case 9. Thus when said lever 37 is swung from the position shown in Fig. 2 in full lines to the dotted-line position there shown the mold-supporting case and mold will be swung downwardly to the position indicated in dotted lines in Fig. 5, whereby the mold is suitably wetted, after which it is again swung upwardly to its operative position. The mold is opened or its two sections are moved one away from the other, as shown in Fig. 9, by sliding each section on said table 63, Fig. 10, by the following-described means: On said shaft 59 (which supports certain parts) are secured two sleeves 69 69, and to each of said sleeves a lever 70 is pivoted, the free ends of the two levers being bent to hook form, each for engagement in the said semicircular groove 61 in the base of the mold-sections 60. Between said sleeves 69 on shaft 59 an arm 65 is rigidly secured, on the end of which is secured a revoluble disk 66, on which are pivoted two connecting-rods 71, which rods by their outer ends engage said two levers 70 70. (See Figs. 8 and 9.) On the border of said disk 66 is a slotted arm 67. A rod 33, pivoted by its lower end to a foot-treadle 31, extends vertically near said disk 66 and carries a pin 68, which engages in the slot of said arm 67, so that when said rod is moved upward or downward the disk 66 is rotated more or less and the said levers 70 are swung, thereby imparting said opening and closing movements to said mold-sections.

At the top of the machine directly over each mold is located a hollow shaft 44, Figs. 1, 2, and 3, arranged to rotate in suitable bearings on a standard 43 and to have a vertical movement in said bearings. A grooved pulley 46 is placed on said shaft between the bearings thereof, having a spline connection with said shaft, whereby said vertical movements are permitted. A lever 34, hung on said standard 43, has one end engaging with said shaft, and its opposite end is pivotally connected to the said rod 33, which is attached by its lower end to said foot-treadle 31. To the lower end of said shaft 44 is secured the blowiron-socket 32, into which the upper end of the blowiron 35 is placed, as shown in Figs. 1 and 13. To the upper end of the said hollow shaft 44 a flexible pipe 45 is suitably connected, which serves to convey air under pressure from any suitable source to said hollow shaft, and thence through an air-passage in said socket to the said blowiron and through the latter to molten glass gathered on the lower end thereof, as usual, when said glass shall be introduced into the mold to be blown.

In Fig. 1 a blowiron is shown in connection with each mold in the positions occupied thereby when glass is being blown. Said blowirons are supported in proper position over the molds by two revoluble disks 56 and 57, Fig. 12, having corresponding semicircular recesses in their borders, two of which constitute an opening suitable for receiving a blowiron therein, as shown. One of said disks 56 has tooth-like projections on its periphery, whereby the two disks have a common revoluble movement when a blowiron is introduced therebetween. Said disks 56 and 57 are supported (two pairs for each blowiron) on two freely-revolving shafts 54 and 55, which shafts are in turn supported by suitable brackets 53, attached to the posts 52 and to the frame of the machine. A snap-spring 84, secured by one end to the bracket 53, may be employed, if desired, for so regulating the rotary motion of the disks 56 and 57 that the blowiron will more surely be brought centrally over the mold. The blowiron has an enlargement 58 thereon, whereby it is adapted to hang on said disks in proper operating position.

The operation of each mold and its accessories in blowing glass is as follows, it being understood that the shafts 6 and 7 are revolving: The operator, having gathered molten glass on the blowiron, presses the foot-treadle 31 downward, thereby through rod 33 and the described devices connected therewith causing the sections of the mold to move one away from the other, and thus open the mold, and also lifting the shaft 44 and the blowiron-socket 32, and the blowiron is then placed under said socket and the glass thereon between said mold parts, the blowiron hanging as shown in Fig. 1. The said treadle is then released and the mold is then closed by the spring 64, and said socket drops onto the end of the blowiron. Air is now conveyed to the glass within the mold, expanding it in the usual manner. The lever 19 is now swung, carrying the clutch-collar into engagement with the clutch-sleeve 21, whereby the table 63 and mold parts thereon are rotated in order to move the surface of the mold against the surface of the hot glass within it and prevent any seamy appearance thereon; also, the mold-bottom is at the same time rotated by the described mechanism in a direction opposite to that of said mold, thereby smoothly finishing the bottom of the blown-glass article. The mold having received the desired number of turns or rotations, the pin 29 on the side of the ratchet-wheel 28 disengages the latch-spring 26 from the lever 19, letting the spring 25 swing said lever and draw said clutch-collar out of engagement with the clutch-sleeve 21, thereby stopping the revolution of the mold. The operator then again operates the treadle 31 and opens the mold and draws the socket 32 off from the blowiron. An attendant at the rear of the mold then removes the blowiron and the article thereon and the operator immediately dips the mold in the water in the tank 3 by means of said lever 37 and described connections between the same and the yoke-box 8 of the mold-supporting case 9, as shown in Fig. 5 in dotted lines, and the mold is then returned to operative position ready for a like successive operation. Should any water remain in the mold after having been brought to operative position again, as aforesaid, the mold may be opened for an instant, as before, when the mold will be sufficiently cleared of water and it will automatically close by its spring. As heretofore set forth, the mold is given a rotary movement while the glass article is being formed therein. Provision is also made, as stated, for rotating the blowiron by means of said hollow shaft 44 and driving means connecting the same with the main driving-shaft 7. When it is desired to rotate both the blowiron and the mold, their rotary motions will be in opposite directions, whereby the surface of the article being blown will be moved with increasing rapidity against the surface of the mold. If desired, the driving connections between said main driving-shaft and hollow blowiron-spindle may be disconnected, thereby stopping the rotation of the blowiron, but still leaving the mold to rotate, as aforesaid.

In this application I have shown a two-part sectional mold; but I desire to state that I am not the inventor of any variety of mold, and at the time of this invention I had never seen one used which had more than two sections.

What I claim as my invention is—

1. In a glass-blowing machine, a revoluble motor-shaft and means for imparting a rotary motion thereto, a mold-case supported by one side for a swinging movement about said shaft independent of the said rotary motion thereof, a mold supported on said case, a tank beneath said shaft, and mechanism for swinging said mold-supporting case and mold into and out from said tank, substantially as set forth.

2. In a glass-blowing machine, a motor-shaft, a mold-supporting case hung for a vertically-swinging movement on said shaft, a mold-table having a pivotal connection with said case, a mold supported on said table, and mechanism between said motor-shaft and mold-table whereby a rotary motion is imparted to said table and mold, substantially as described.

3. In a glass-blowing machine, a motor-shaft, a mold-supporting case hung for a vertically-swinging movement on said shaft, a mold-table having a pivotal connection with said case, a mold supported on said table, and mechanism between said motor-shaft and mold-table whereby a rotary motion is imparted to said table and mold, a tank beneath said mold-supporting case and mechanism for swinging said case and mold into and out from said tank, substantially as described.

4. In a glass-blowing machine, a motor-shaft, a mold-supporting case hung for a vertically-swinging movement on said shaft, a mold-table having a pivotal connection with said mold-supporting case, a mold supported on said table, mechanism between said motor-shaft and mold-table whereby a rotary motion is imparted to said table and mold, and mechanism for automatically arresting the rotation of said mold, substantially as described.

5. In a glass-blowing machine, a motor-shaft, a mold-supporting case hung for a vertically-swinging movement on said shaft, a mold-table having a pivotal engagement with one side of said mold-supporting case, and having a gear fixed thereon, two mold-sections having a sliding engagement with said table, mechanism between said motor-shaft and mold-table whereby a rotary motion is imparted to said table, and mechanism for sliding said mold-sections from and toward each other, substantially as described.

6. In a glass-blowing machine, a mold-supporting case, a mold-table having a pivotal connection with said case, a mold supported on said table, mechanism for imparting a rotary movement to said mold and table, and means for wetting said mold, substantially as described.

7. In a glass-blowing machine, a movable mold-supporting case, a mold-table having a pivotal engagement with said case and having a gear fixed thereon, a mold carried on said table, a shaft extending from the interior of said mold through the bottom thereof and through said mold-table and case having a head thereon constituting the bottom of said mold, a gear fixed on said shaft, and gearing engaging the gears on said shaft and said table, means for rotating said gearing, whereby the mold and the bottom thereof are caused to be rotated in opposite directions, and means for moving said mold-supporting case, substantially as described.

8. In a glass-blowing machine, a mold-supporting case, a mold-table having a pivotal connection with said case, a mold supported on said table, mechanism for imparting a rotary motion to said table and mold, and mechanism acting to cause a cessation of the rotation of said mold subsequent to a predetermined number of rotations thereof, substantially as described.

9. In a glass-blowing machine, a mold-supporting case, a rotary mold-table having a pivotal connection with said case, a sectional mold supported on said table, a motor-shaft, mechanism actuated by said shaft for imparting a rotary motion to said table and mold, and mechanism acting to cause a cessation of said table and mold rotation at a point therein when the dividing-planes of the mold-sections stand at right angles to the axis of said shaft, substantially as described.

10. In a glass-blowing machine, a motor-shaft, a mold-supporting case hung for swinging movement on said shaft, a mold-table having a pivotal engagement with one side of said case and having a gear fixed thereon, two mold-sections having a sliding engagement with said table, a shaft extending from the interior of said mold through the bottom thereof and through said mold-table and mold-supporting case, having a head thereon constituting the bottom of the mold, and gear connections between said last-named shaft and between said table and the motor-shaft, whereby simultaneous rotary movements are imparted to said mold-bottom shaft and said mold-table, in opposite directions, substantially as described.

11. In a glass-blowing machine, a motor-shaft, a mold-supporting case hung for a vertically-swinging movement on said shaft, a mold-table having a pivotal connection with said mold-supporting case, a mold supported on said table, a clutch-sleeve having a gear fixed on one end thereof carried on said motor-shaft in which sleeve the latter rotates freely, gear connections between said clutch-sleeve gear and mold-table whereby a rotary motion is imparted to said table and mold, a clutch-collar sliding on and having a spline connection with said motor-shaft, and a shipping-lever engaging said collar whereby the latter is moved into and out of engagement with said clutch-sleeve, substantially as described.

12. In a glass-blowing machine, a mold-supporting case, a motor-shaft on which said case is hung, a mold-table having a pivotal connection with said case, a mold supported on said table, a clutch-sleeve having a gear fixed on one end thereof carried on said motor-shaft in which sleeve the latter rotates freely, gear connections between said clutch-sleeve gear and mold-table whereby a rotary motion is imparted to said table and mold, and means for effecting the temporary engagement of said motor-shaft and clutch-sleeve, whereby the latter and said motor-shaft are caused to rotate coincidingly and means for automatically effecting the disengagement of said sleeve and shaft after said clutch-sleeve and mold shall have completed a predetermined number of revolutions while a glass article is being formed in said mold, substantially as described.

13. In a glass-blowing machine, a motor-shaft, a mold-supporting case hung for a vertically-swinging movement on said shaft, a mold supported on said case, a tank beneath said shaft, mechanism for swinging said mold-supporting case and mold about said shaft into and out from said tank, a blowiron and means for supporting the same in operative relation to said mold, a revoluble hollow shaft carrying a sleeve for engagement with said blowiron, means for imparting rotary motion to said shaft, and an air-conduit in communication with the latter, substantially as described.

14. In combination, in a glass-blowing machine, a motor-shaft, a mold-supporting case hung on said shaft for a swinging movement vertically, a mold-table, having a pivotal connection with said mold-supporting case, a mold supported on said table, a clutch-sleeve having a gear fixed on one end thereof carried on said motor-shaft and normally disengaged therefrom, gear connections between said clutch-sleeve gear and mold-table, whereby, through the rotation of said sleeve, rotary motion is imparted to said table and mold, a clutch-collar on said motor-shaft having a sliding engagement therewith and engaging said sleeve, a pin 27, projecting radially from said sleeve, a pivoted shipping-lever connected to said clutch-collar, a latch-spring 26 supported near said shipping-lever for engagement with said lever when said collar and sleeve are interengaged, a ratchet-wheel located near said sleeve whose teeth are successively engaged by said pin 27, and carrying on one face thereof a laterally-projecting pin 29, a post fixed on said shipping-lever having a cam-surfaced arm for engagement with said pin 29, whereby the free end of said shipping-lever is lifted and disengaged from said latch-spring and means for swinging said lever and clutch-collar from said sleeve, substantially as described.

15. In a glass-blowing machine, the combination of a mold with means for rotating the same, and means for automatically stopping the rotation of the mold after a predetermined number of rotations thereof have been made, and means for varying the number of rotations as may be desired.

16. In a glass-blowing machine, the combination of a mold and a blowiron, means for imparting with respect to the said mold and blowiron a rotational movement to the one relative to the other, means for automatically stopping such relative movement of rotation after a predetermined number of rotations have been made, and means for varying the number of said rotations as may be desired.

17. In a glass-blowing machine, a support for a blowpipe, an air-supply conduit, a coupler on the end thereof movable for making air-supply connection between the air-supply conduit and the blowpipe after the latter is in its support, a sectional mold, and a common means movable to different positions to actuate the coupler and the mold-sections.

18. In a glass-blowing machine, a support for a blowpipe a longitudinally-movable coupler for connecting the air-supply conduit to one end of the blowpipe, a sectional mold in which the gather is adapted to be shaped during the blowing, a single actuating-rod movable to different positions and having connection with the coupler and the sections of the mold, and means for moving said rod to simultaneously move the coupler and mold-sections.

19. In a glass-blowing machine in which a blowpipe is detachably supported in operative relation to an air-supply pipe and a sectional mold, a coupler, movable after the blowpipe is in its support to effect air communication between the conduit and blowpipe, the blowpipe, the sectional mold, and a single actuating device for the coupler and mold-sections, under the control of the operator for each operation.

20. In a glass-blowing machine, a driven shaft, a rotating mold supported thereon, a drive connection between the mold and the shaft, and a clutch in said connection.

21. In a glass-blowing machine, the combination of a series of non-traveling sectional molds, blowpipe-supports and vertically-reciprocating air-supply couplings, supported side by side, a common drive mechanism for the rotatable movement of all the blowpipes, a tank, and independent actuating devices for opening and closing and wetting each mold.

22. In a glass-blowing machine, the combination with a detachable rotatable blowpipe, a support therefor, the air-conduit, a rotating coupler movable to connect the end of the blowpipe to the conduit, and means under the control of the operator for effecting this coupling after the blowpipe is in its support.

In testimony whereof I affix my signature in presence of two witnesses.

HENRY J. COLBURN.

Witnesses:
P. S. WILLIS,
FRANK D. SUYDAM, Jr.